(12) United States Patent
Sacilotto, Jr.

(10) Patent No.: US 10,567,502 B2
(45) Date of Patent: Feb. 18, 2020

(54) FORMAT-INDEPENDENT MEDIA FILE INDEXING

(71) Applicant: Avid Technology, Inc., Burlington, MA (US)

(72) Inventor: Roger P. Sacilotto, Jr., Saugus, MA (US)

(73) Assignee: AVID TECHNOLOGY, INC., Burlington, MA (US)

(*) Notice: Subject to any disclaimer, the term of this patent is extended or adjusted under 35 U.S.C. 154(b) by 327 days.

(21) Appl. No.: 15/480,848

(22) Filed: Apr. 6, 2017

(65) Prior Publication Data
US 2018/0295184 A1  Oct. 11, 2018

(51) Int. Cl.
| | |
|---|---|
| *H04L 29/08* | (2006.01) |
| *G06F 16/41* | (2019.01) |
| *G06F 16/435* | (2019.01) |
| *G06F 16/40* | (2019.01) |
| *G11B 27/031* | (2006.01) |
| *G11B 27/10* | (2006.01) |

(52) U.S. Cl.
CPC .......... *H04L 67/1095* (2013.01); *G06F 16/40* (2019.01); *G06F 16/41* (2019.01); *G06F 16/435* (2019.01); *G11B 27/031* (2013.01); *G11B 27/10* (2013.01); *H04L 67/2842* (2013.01)

(58) Field of Classification Search
CPC . H04L 41/0672; H04L 41/12; H04L 67/2842; G06F 15/16; G06F 16/27; G06F 11/2097
USPC ........................... 709/217, 219, 222; 348/143
See application file for complete search history.

(56) References Cited

U.S. PATENT DOCUMENTS

| | | | | |
|---|---|---|---|---|
| 4,498,171 A | * | 2/1985 | Munter | H04Q 1/4575 370/525 |
| 5,249,262 A | * | 9/1993 | Baule | G06F 8/313 706/50 |
| 9,948,518 B2 | * | 4/2018 | Kamath | H04L 41/12 |
| 2004/0199507 A1 | | 10/2004 | Tawa | |
| 2006/0279628 A1 | * | 12/2006 | Fleming | G11B 27/034 348/143 |
| 2010/0262710 A1 | | 10/2010 | Khatib | |
| 2010/0325252 A1 | * | 12/2010 | Stuhlmeyer | H04L 41/0803 709/222 |
| 2014/0180664 A1 | * | 6/2014 | Kochunni | G06F 11/3442 703/21 |

(Continued)

OTHER PUBLICATIONS

Demystifying Audio Metadata, Journal of the Audio Engineering Society, Audio Engineering Society, New York, NY, vol. 51, No. 7/8, Jul. 1, 2003, pp. 744-751.

*Primary Examiner* — Tesfay Yohannes
(74) *Attorney, Agent, or Firm* — Oliver Strimpel

(57) ABSTRACT

A media file indexing service involves maintaining a media file index in a location external to the media file itself. The index is built up incrementally as the media file is being captured or transferred to shared storage. Client systems receive raw messages with information as to the location within the media file of media elements within each media file portion after it is written to shared storage, or receive refined messages indicating changes to the media file without the associated location information. Clients may query the index maintained by the index service for specific media elements during file capture, enabling edit-while-capture workflows.

20 Claims, 5 Drawing Sheets

(56) References Cited

U.S. PATENT DOCUMENTS

| | | | |
|---|---|---|---|
| 2015/0296033 A1* | 10/2015 | Jung | G06Q 50/01 |
| | | | 709/217 |
| 2016/0275642 A1* | 9/2016 | Abeykoon | G06T 1/20 |
| 2016/0350391 A1* | 12/2016 | Vijayan | G06F 3/065 |
| 2018/0113632 A1* | 4/2018 | Sancheti | G06F 9/45533 |
| 2018/0143880 A1* | 5/2018 | Dornemann | G06F 11/203 |
| 2018/0278647 A1* | 9/2018 | Gabaev | H04L 63/1466 |

* cited by examiner

| Frame No. | Byte Offset | Frame Size | Frame Type/Info |
|---|---|---|---|
| 0 | 100,000 | 50,000 | — |
| 1 | 150,000 | 50,000 | — |
| ... | ... | ... | ... |
| n-2 | 2,550,000 | 50,000 | — |
| n-1 | 2,600,000 | 50,000 | — |
| n | 2,650,000 | 50,000 | — |

FIG. 2
(Prior Art)

FORMAT-INDEPENDENT MEDIA FILE INDEXING

BACKGROUND

Media files commonly include within them an index, which provides information as to the location of individual elements within the file. In the case of video files, the index provides locations of the video frames within the file, and in the case of audio files the index provides locations of individual audio samples within the file. This information is required, for example, when a media processing or editing application needs to read a specific portion, or clip from a media file. By referring to the index, the application is able to locate the clip, and retrieve it for playback or for other purposes. For files in which each of the elements has a fixed size, it may be possible to locate a specific element by knowing its sequential position within the media file. However, modern media files often include elements of variable size, especially in video files, where the size of each frame depends on the degree to which it is compressed, and/or on its dependency on other frames when interframe compression techniques are involved. In such files, in addition to information as to the location of each frame, the index includes information about the frame's dependency on other frames.

In the various video file formats that have an index, the index is either placed at the end of the file, or in sections distributed over the file, or in reserved space at the beginning of the file and periodically updated during file capture or transfer. In each of these formats, the index is either not available until the entire video file is present, or it becomes partially available before the file is complete, but at the cost of increased latency, processing cost, the need to use otherwise undesirable formats, exception workflows, and a risk of error.

With the increasing premium on rapid turnaround workflows, it is essential for media editors to be able to work with video files before the file is completely captured or before it is completely transferred into storage accessible to their media processing application. This is especially important for files that take an extended period to capture, e.g., a live sporting event, or files that are large and take time to transfer over the bandwidth that is available. There is therefore a need for systems and methods that can effectively support rapid, "edit while transfer" (EWT) workflows, enabling such files to be worked on before they are fully written or transferred to an editing or archiving system.

SUMMARY

In general, the methods, systems, and computer program products described herein provide a media file index service that facilities edit-while-capture workflows.

In general, in one aspect, a method of maintaining an index for a media file includes: at a first system, receiving an indication that a media file is to be received; creating an index for the media file on a second system; and for each portion of a plurality of portions of the media file: the first system: receiving the portion; sending the portion to a shared media storage system to be stored on the shared media storage system; and sending to a message broker system a raw message that includes information defining locations within the media file of a plurality of media elements comprising the received portion; the message broker system: receiving the raw message; and broadcasting the raw message on a message bus; and at the second system: receiving the raw message from the message broker system, and adding to the index the information defining locations within the media file of the plurality of media elements comprising the received portion.

Various embodiments include one or more of the following features. A quantity of data contained within each portion of the plurality of portions of the media file corresponds to a storage capacity of a file system cache of the first system. The media file is a video file, and each media element of the plurality of media elements is a video frame of the video file. The media file is an audio file, and each media element of the plurality of media elements is an audio sample of the audio file. Converting the received raw message into a refined message, wherein the refined message includes a notification that the media file has changed and does not include the information defining locations within the media file of the plurality of media elements comprising the received portion; and sending the refined message to the message broker; and the message broker receiving and broadcasting the refined message over the message bus. A third system connected to the message bus and to the shared storage, wherein the third system: receives the raw message broadcast by the message broker; uses the information defining the locations within the media file of the plurality of media elements comprising the received portion of the media file to retrieve from the shared storage one or more of the plurality of elements comprising the received portion of the media file; and enables a user of a media editing application running on the third system to view and edit a portion of the media file that includes the retrieved one or more of the plurality of elements. A third system connected to the message bus and to the shared storage, wherein the third system: is configured to receive raw messages from the message broker; and requires an element of the media file that it has not previously retrieved from shared storage; and further comprising the third system: determining whether the third system has information from previously received raw messages that specifies whether the required element is available from the shared storage; if the third system has information from previously received raw messages that the required element is available from the shared storage, using information defining a location of the required element within the media file to retrieve the required element from the shared storage; and if the third system does not have information from previously received raw messages that the required element is available from the shared storage, issuing a query to the second system to determine whether the index includes an entry for the required element and, if the index includes an entry for the required element, retrieving from the index location information for the required element and using the location information to retrieve the required element from shared storage. If the third system receives a response from the second system that the index does not include an entry for the required element, displaying on a display of the third system an indication that the requested element is not yet available. A third system connected to the message bus and to the shared storage, wherein the third system: is configured to receive refined messages from the message broker; and requires an element of the media file that it has not previously retrieved from shared storage; and further comprising: issuing a query to the second system to determine whether the index includes an entry for the required element, and, if the index includes an entry for the required element, retrieving location information for the required element retrieving the required element from shared storage; and if the third system receives a response from the second system that the index does not include an entry for the required element: after waiting until the required element is expected to be present on the shared storage, issuing a second query to the second system to determine whether the index includes an entry for the required element; and if the index includes an entry for the required element, retrieving from the index location information for the required element and using the location information to retrieve the required element from shared storage. Information as to when the required element is expected to be present is included within a raw message received by the third system. Information as to when the required element is expected to be present is included within a refined message received by the third system. A third system connected to the message bus and to the shared storage, wherein the third system: is configured to receive refined messages from the broker; and requires an element of the media file that it has not previously retrieved from shared storage, the required element corresponding to a temporal location within the media file that is temporally close to a most recently captured element of the media file; and further comprising: the third system receiving a refined message; and in response to receiving the refined message, issuing a query to the second system to determine whether the index includes an entry for the required element, and if the index includes an entry for the required element, retrieving from the index location information for the required element and using the location information to retrieve the required element from shared storage.

In general, in another aspect, an indexing system includes: a memory for storing computer-readable instructions; and a processor connected to the memory, wherein the processor, when executing the computer-readable instructions, causes the indexing system to perform a method for maintaining an index for a media file, the method comprising: in response to receiving an indication that a media file is to be received by a writing system for writing the media file to shared storage, creating an index for the media file on the indexing system; and for each portion of a plurality of portions of the media file received by the writing system: receiving over a message bus a raw message from a message broker, wherein the raw message was received by the message broker from the writing system, and wherein the raw message includes information defining locations within the media file of a plurality of media elements comprising the received portion of the media file; and adding to the index the information defining locations within the media file of the plurality of media elements comprising the received portion of the media file.

Various embodiments include one or more of the following features. Converting the received raw message into a refined message, wherein the refined message includes a notification that the media file has changed and does not include the information defining locations within the media file of the plurality of media elements comprising the received portion; and sending the refined message to the message broker for broadcasting the refined message over the message bus. In response to receiving a query from a reading system for location information within the media file for a specified one or more elements of the media file: if the index includes an entry for the specified one or more elements of the media file, providing a response to the reading system that includes location information for the specified one or more elements of the media file. The method for maintaining an index for a media file further comprises: If the index does not include an entry for the specified one or more elements of the media file, providing a response to the reading system that includes information as to a temporal location of a most recently received element of the media file.

In general, in a further aspect, a computer program product includes a non-transitory computer-readable medium with computer program instructions encoded thereon, wherein the computer program instructions, when processed by an indexing system instruct the indexing system to perform a method for maintaining an index for a media file, the method comprising: in response to receiving an indication that a media file is to be received by a writing system for writing the media file to shared storage, creating an index for the media file on the indexing system; and for each portion of a plurality of portions of the media file received by the writing system: receiving over a message bus a raw message from a message broker, wherein the raw message was received by the message broker from the writing system, and wherein the raw message includes information defining locations within the media file of a plurality of media elements comprising the received portion of the media file; and adding to the index the information defining locations within the media file of the plurality of media elements comprising the received portion of the media file.

Various embodiments include one or more of the following features. Converting the received raw message into a refined message, wherein the refined message includes a notification that the media file has changed and does not include the information defining locations within the media file of the plurality of media elements comprising the received portion; and sending the refined message to the message broker for broadcasting the refined message over the message bus. In response to receiving a query from a reading system for location information within the media file for a specified one or more elements of the media file: if the index includes an entry for the specified one or more elements of the media file, providing a response to the reading system that includes location information for the specified one or more elements of the media file. If the index does not include an entry for the specified one or more elements of the media file, providing a response to the reading system that includes information as to a temporal location of a most recently received element of the media file.

BRIEF DESCRIPTION OF THE DRAWINGS

FIG. 2 is an illustration of a prior art index for a media file.

DETAILED DESCRIPTION

Media files that are indexed fall into one of three categories. In the first, the index is placed at the end of the file. Such an index can only be written to the file when the entire file is captured or transferred. In the second category, the index is split into sections and written at various locations within the file. Since the index in such a file is fragmented, an application needing to access a particular element first has to locate the section of the index containing the location information of the required element, and then look up the information within the located section. In the third category, index space is reserved up-front in the file and periodically updated while the file is being captured. This reduces flexibility when the file length is not known in advance since capture has to end once the reserved space has expired, or conversely, if the file is terminated earlier than anticipated (i.e., the file is smaller than expected), some of the reserved index space is wasted. Each of these indexing methods has disadvantages in terms of one or more of latency, processing requirements, or flexibility.

The systems and methods described herein are independent of the format of the media file, and reduce latency and processing requirements, and increase flexibility. Furthermore, they enable an editor using a client system to access and manipulate a media file even while it continues to be captured or transferred to the client and is therefore incomplete. Such situations may arise when large media files corresponding to a long temporal duration are being captured. Such media may be received via a satellite feed, or directly from a media capture device, such as a camera or a set of microphones. Examples include live events, such as sporting events or artistic performances, or a news feed, which may last many minutes or hours. Rather than wait until the file is complete, i.e., until the sporting event or artistic performance has ended, editors may need to use media from the file to produce pieces based on the portion of the file already captured while the media continues to be captured, or immediately after the event or performance is over. For example, in a live sporting event having several parts, editors may wish to prepare a synopsis of the highlights of one part to air during a break before the next part starts. With a news feed, an editor may wish to create a summary or a preview of a breaking story before the full report on the story is available. As another example, Web broadcasts including edited excerpts of the media being captured may be issued during a live event.

Figure 1:
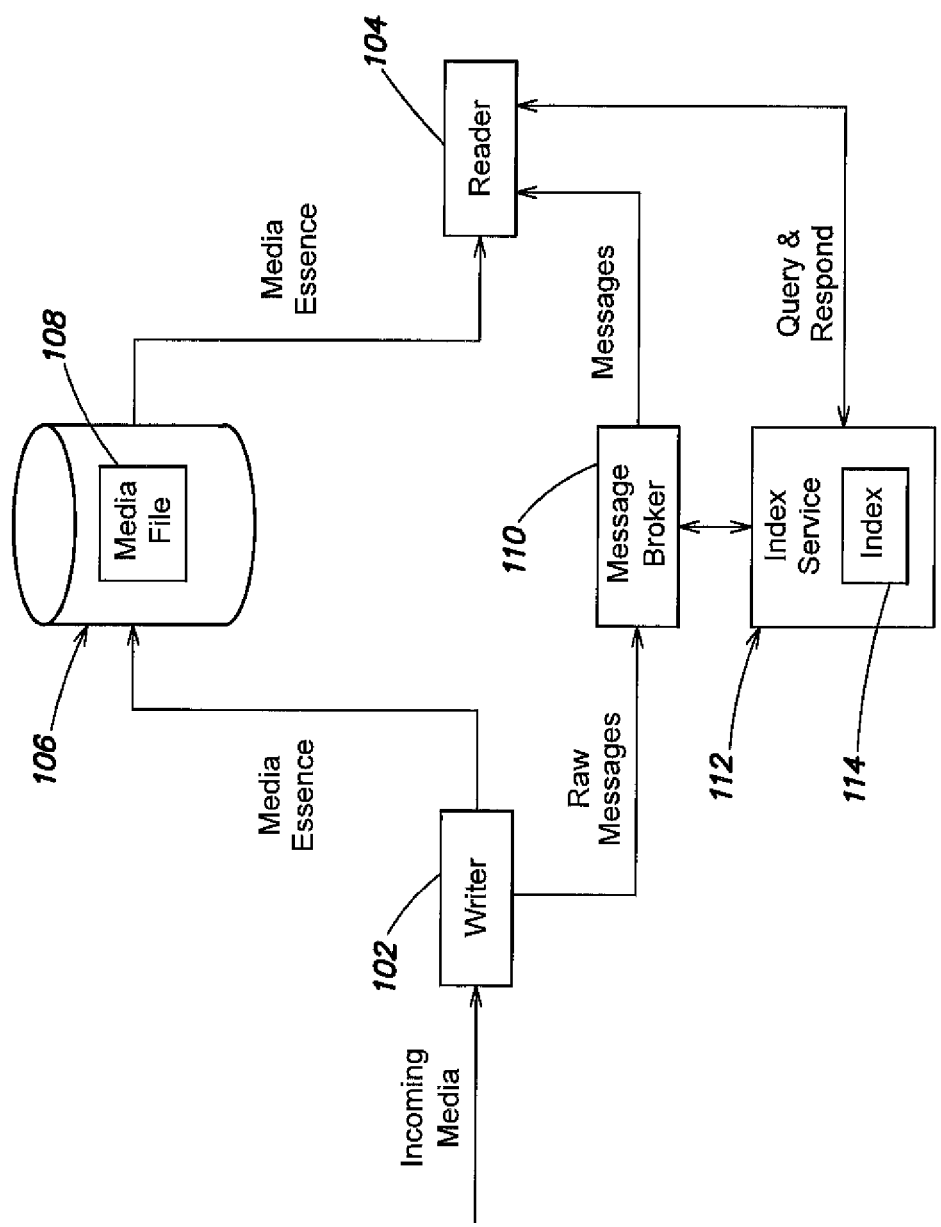
FIG. 1 is a high level diagram showing a system for maintaining a media file index external to the media file.

A high level block diagram of the various components of the described media file indexing system is illustrated in FIG. 1. Writer system 102 is a computer system that is receiving media (as media elements or as a stream of bytes) that is in the process of being captured, or that is being transferred from one system to another. Although the use of the system is described herein with reference to media capture applications, it is applicable to media transfer as well. A writer system may be implemented by a video server, such as the AirSpeed® system available from Avid Technology, Inc., of Burlington, Mass. Reader system 104 is a computer that is reading the media file that is being captured or transferred from writer system 102. The writer system incrementally writes portions of the captured media to shared storage 106 where it is stored within media file 108. While media is being captured, each incremental portion written to the shared storage is generally the media that has been captured and received by the writing system since the previous portion was written out to shared storage. When such an incremental writing operation is complete, writer system 102 publishes a raw message containing information as to the offset of the new frames that have been written, together with descriptive information about the frames. The raw message is received by message broker 110. Message broker 110 broadcasts the received raw message, which is received by systems that are subscribed to the raw message channel. Index service system 112 is subscribed to the raw message channel and receives all broadcast raw messages. The index service maintains index 114 for media file 108 that specifies the location within the media file of each element that has been written to the file. Since low latency is desirable for the index service, index 114 is usually stored in RAM.

FIG. 2 is a high level illustration of an exemplary structure of a media index. Entries in the index are keyed by element number 202, with each entry including a byte offset of the element 204, element size 206, as well as information about the element 208. FIG. 2 illustrates an index for a video file, in which the elements are frames, and the information about each element is a frame type, such as I, P, or B in an interframe (group of pictures-based) compression scheme. Index service system 112 may be located locally to writer system 102 and/or reader system 104, and connected to these systems with a local area network. In other embodiments, the index service system may be remote or in the Cloud, and may be connected to the writer and reader systems via the internet. Referring again to FIG. 1, reader system 104 is also connected to the message bus and may receive messages from the message broker. Reader system 104 runs a media editing application that requires media from media file 108. An example of such a media editing application is the video editing application Media Composer® from Avid® Technology, Inc. of Burlington, Mass., described in part in U.S. Pat. Nos. 5,267,351, 5,355,450, and 5,930,445, which are incorporated herein by reference. For audio editing, an example of such a media editing application is a digital audio workstation which refers to a software application for recording, editing, and storing digital audio. An example of such a digital audio workstation is Pro Tools®, also from Avid Technology, Inc. Media editing applications may be hosted locally on a client or in a client-server or cloud-based environment.

Figure 3:
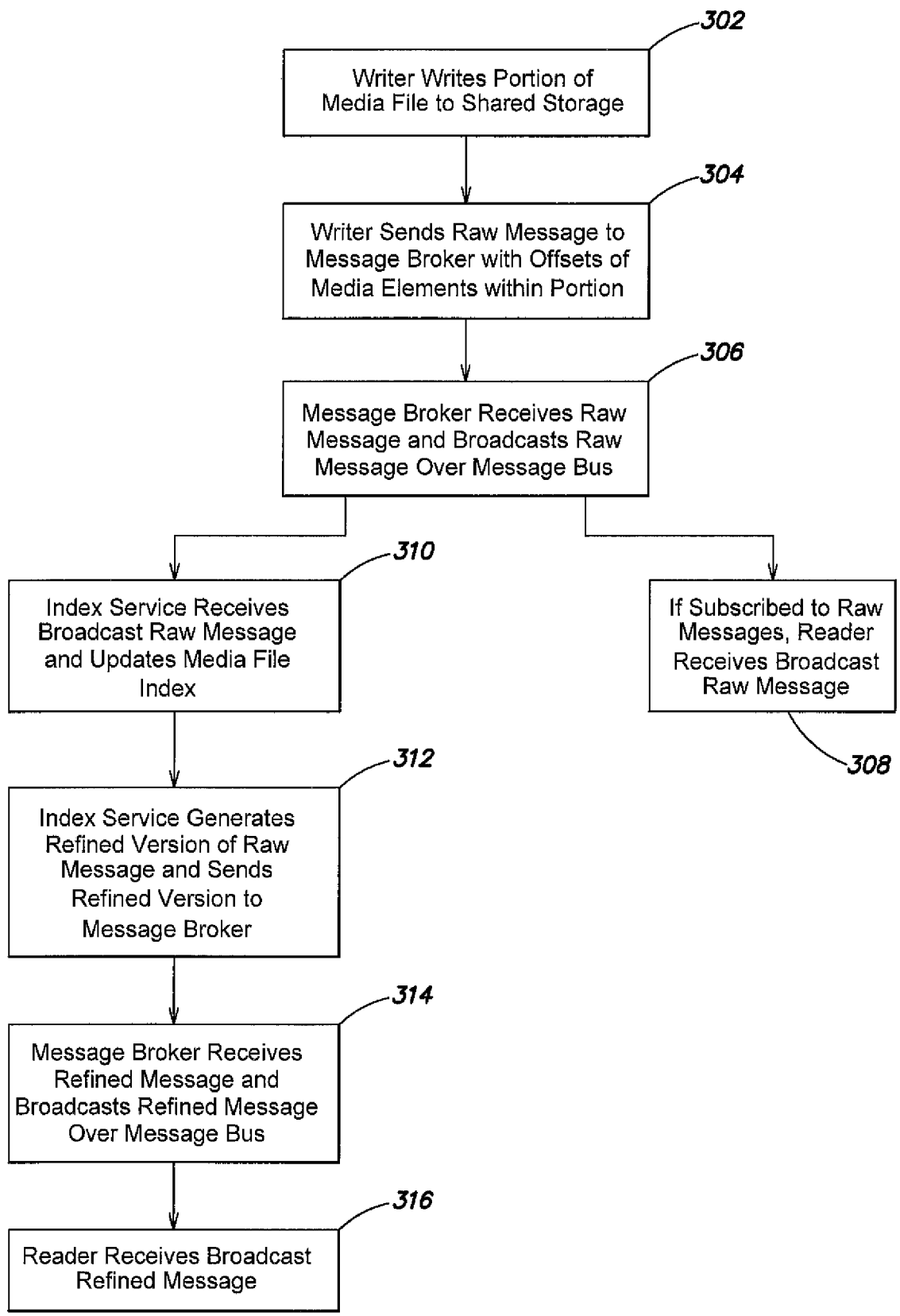
FIG. 3 is a high level flow diagram of steps that are performed by the system illustrated in FIG. 1 when a portion of a media file is written to shared storage.

FIG. 3 is a high level flow diagram illustrating a sequence of steps that occurs when writer system 102 writes a portion of the media file to shared storage 106 (step 302). After completing the writing operation, the writer system sends a raw message to message broker 110 (step 304). The raw message contains information defining the byte offset of each element in the written portion of the media file. In some embodiments in which media elements being written are each of a constant size, the raw message may specify an element size and the frame numbers (or range) of the frames that have been written, instead of specifying the location of each element individually. While this reduces the size of a raw message, it increases the complexity of the software in the receiving systems. Raw messages also include some descriptive information about the elements. For example, if the media file is a video file and interframe compression is being used to compress the file, the descriptive information may specify the type of each frame, i.e., I, P, or B.

The message broker receives the raw message and broadcasts it over the message bus (step 306). If reader system 104 is subscribed to the raw messages, it will receive the message (step 308). Index service system 112 is subscribed to the raw message channel, and receives the broadcast raw message (step 310). It uses the information the message contains to create (if a media file is being opened), update, or close (if the media file is complete) the media file index (step 310). When updating the index, the location information for the newly added elements to the media file is added to index 114. Index service system 112 then generates a refined version of the raw message, and sends this to the message broker (step 312). The message broker receives the refined message, and broadcasts it on the message bus (step 314). The reader then receives the broadcast refined message (step 316). Refined messages include less information than the raw messages from which they are derived. In the described system, a refined message includes a notification as to whether the media file has been opened, whether it has been modified, or whether it has been closed. It may also include information as to the temporal location of the most recent element written to the file, which corresponds approximately to the location of the record head. Optionally, the refined message also includes call back information that can be used by a reader when issuing a query to the index service to specify that the query relates to a specific refined message. Refined messages do not include location information of the newly written media file elements. Since refined messages contain less information than raw messages, their broadcast over the message bus places less load on the network than the broadcast of raw messages.

Figure 4:
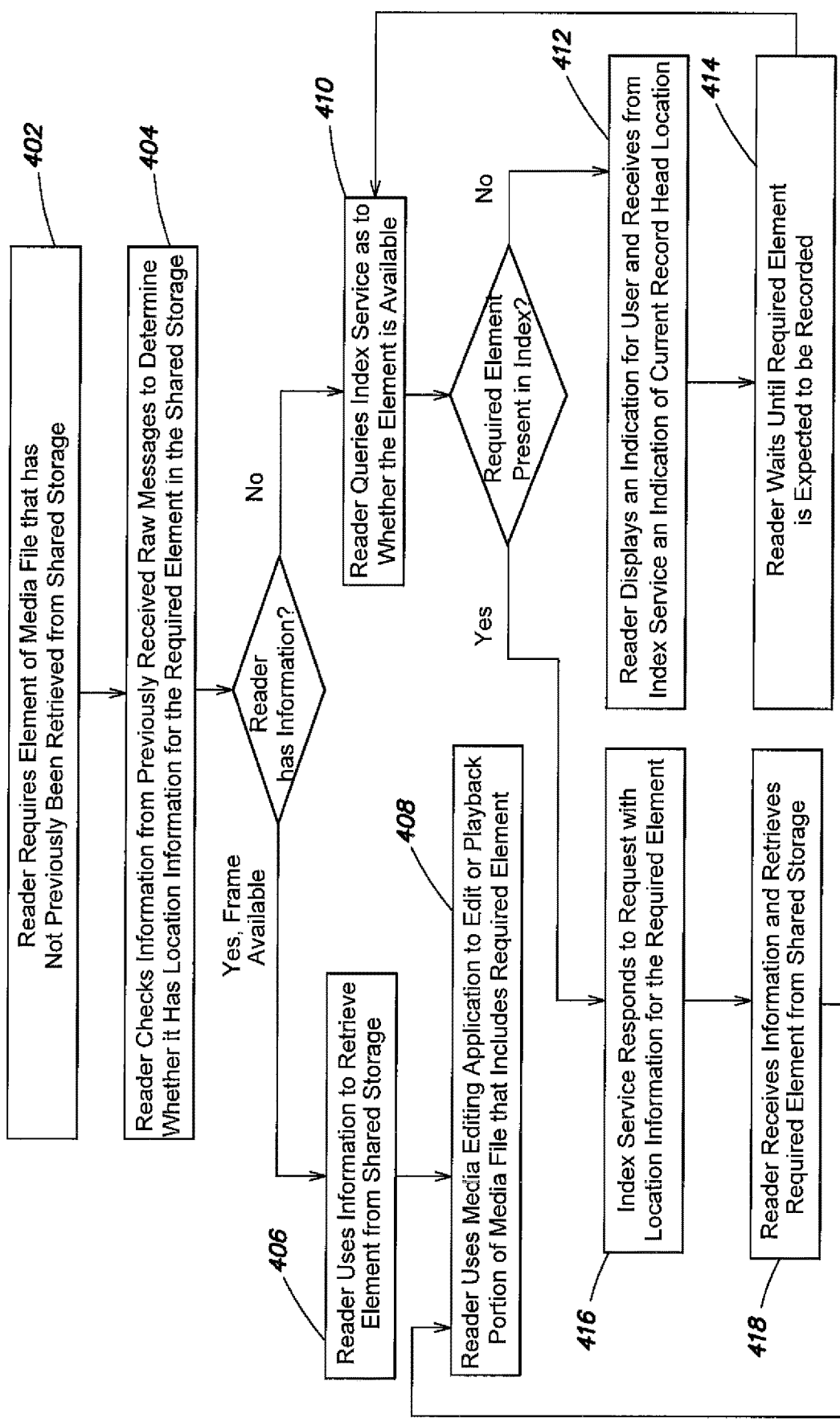
FIG. 4 is a high level flow diagram of steps that are performed when the reader system of FIG. 1 requires an element from a media file while the reader system is subscribed to raw index-related messages.

We now describe exemplary flow diagrams for the two cases in which (i) reader system 104 is subscribed to the raw message channel and (ii) when it is subscribed to the refined message channel. Starting with the former case, FIG. 4 is a high level flow diagram illustrating a sequence of steps that takes place when a reader system that is subscribed to the raw message channel requires an element from the media file. The required element may be one or more video frames from a video file, or one or more samples from an audio file. The process starts when the reader system requires an element from the media file that has not been previously retrieved from shared storage (step 402). The element may be required if an editor wishes to edit or play back the media element. The reader first checks to determine whether it has information derived from previously received raw messages with location information for the required element on the shared storage (step 404). The lack of such information may indicate (i) that the required element has not yet been written to shared storage, or (ii) that the reader system has not received the information, for example if it was broadcast before the reader system started subscribing to the raw message, or (iii) that the reader system received the information but has not retained it, since, depending on the storage and processing capacity of the reader system, only some the contents of raw messages may be been retained. In some systems, the previously received notifications may have been summarized in a table, or only a certain portion of the notifications may have been retained. For example, if an editor's region of interest is at a certain temporal location within the media file, notifications concerning portions near that region of interest may be retained, but notifications from other locations, e.g., significantly earlier or later, may have been discarded.

The amount of index information from previously received messages that is retained by the reader system depends on the user context of the system. If low latency is a priority, the reader system retains as much index information as possible, so that it does not incur the delay incurred by the need to issue queries to the index service in order to retrieve needed elements. Such a situation arises during craft editing of a video program, when an editor plays back precisely selected portions of the media and high responsiveness is necessary. Apart from slowing down the work, unexpected latencies may appear to be a problem with the media itself as opposed to a delay introduced by the editing system. In other contexts, low latency is not as important. In this situation, the reader system may conserve memory by retaining only a portion of the index information received in raw messages, or may subscribe only to refined messages, and query the index only when new frames are needed. An example of such a context arises when media is being logged, since a short delay does not affect the process since it is inherently somewhat approximate.

If the reading system finds that it has information from previously received raw messages with the location of the required element on shared storage, the system uses such information to retrieve the required element (step 406). The required element may then be used by a media editing application running on the reader system to edit or play back a portion of the media file that includes the required element that has now been retrieved (step 408).

If the reader system does not have information from previously received raw notifications that the required element is available, the reader system queries the index service (step 410). If the index service does not contain an entry for the required element, the reader system displays an indication for the user, such as "Media Capture in Progress" (step 412). The index service may also return information on the current temporal location of the most recently added index entry, which provides an approximation to the location of the record head (step 412). By comparing the information as to the location of the record head with the temporal location of the required element, the reader system can estimate when the required element will be available on the shared storage, and wait this estimated amount of time (step 414) before querying the index service again (step 410). When the index system responds to the query with a response containing the location information for the required element (step 416), the reader system receives the location information from the index service and retrieves the required element from shared storage (step 418). It can then use a media editing application running on the reader system to edit or play back a portion of the media file that includes the required element (step 408).

Figure 5:
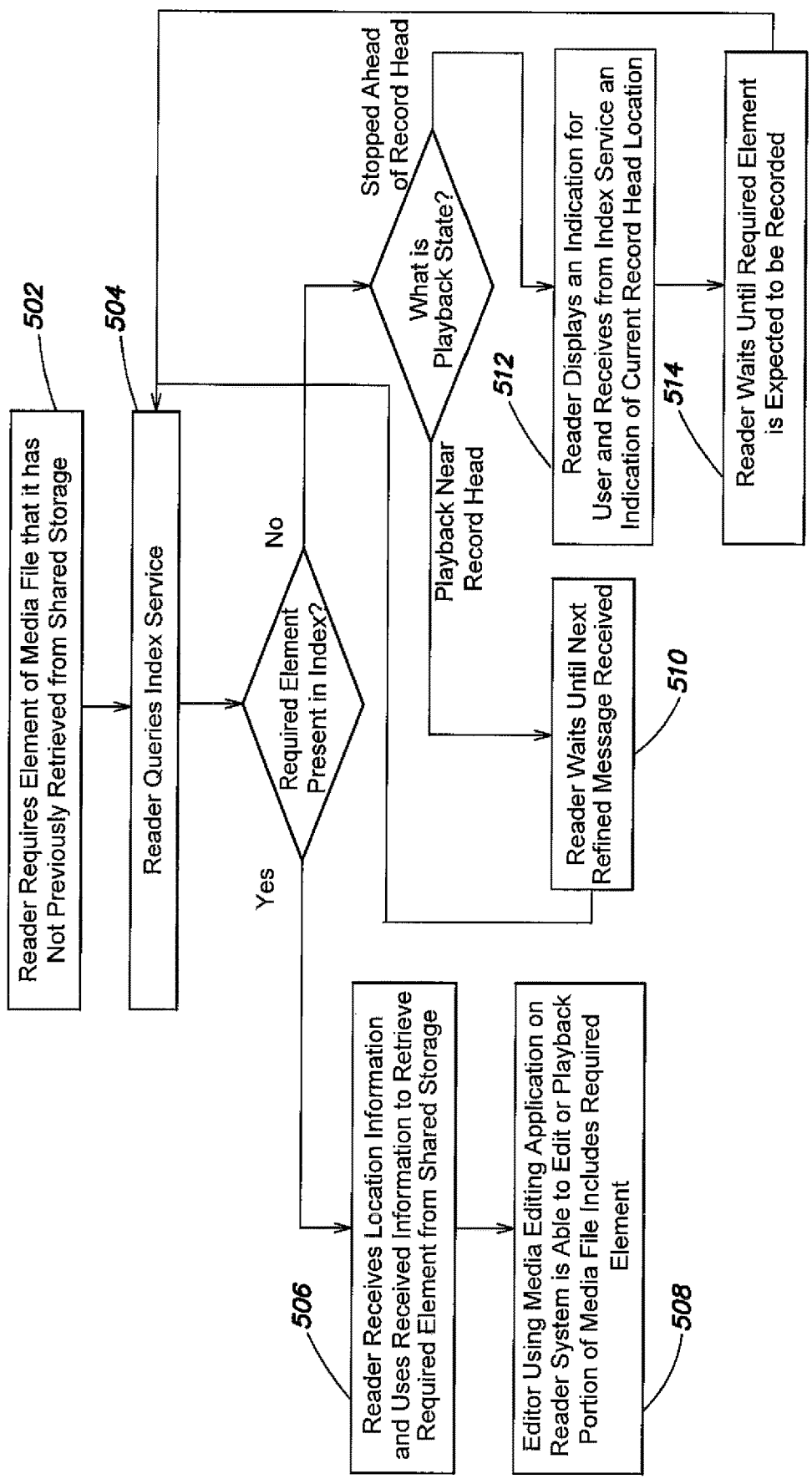
FIG. 5 is a high level flow diagram of steps that are performed when the reader system of FIG. 1 requires an element from the media file while the reader system is subscribed to refined index-related messages.

When a reader system does not have a need for newly added media element location information at the time it is added to the media file, it may subscribe to the refined messages, which reduces unnecessary traffic on the message bus. This situation may arise when an editor is using the reading system to work on a portion of the media file that has already been written to shared storage, and does not require more recently added media. Conversely, it may arise when an editor plans to edit or play back media that is not expected to be captured for some time, and thus it can wait until the media is expected before paying attention to messages from the index service. FIG. 5 is a high level flow diagram illustrating the case when the reader system is subscribed to refined messages (and not to raw messages) from the index service. The sequence starts when the reader system requires an element of the media file that it has not previously retrieved from shared storage (step 502). The reader system queries the index service to determine whether an entry for the required element is present in the index (step 504). If the index contains an entry for the required element, the index service responds to the query with the location information for the required element. The reader system receives the response from the index service containing the location information, and uses that to retrieve the required element from shared storage (step 506). An editor may now use a media editing application running on the reader system to edit or play back a portion of the media file that includes the required element (step 508).

If the required element is not present in the index when the reader system queries the index service, it sends a response to this effect to the reader system, together with information as to the temporal location of the most recently added frame, which corresponds approximately to the location of the record head. The reader system may be in one of two playback states. In one state, the editor is working with media that is close to the record head, perhaps even playing back and editing media as it is received. In this case, the reader system expects that any further changes to the media file will correspond to the most recent portion of media being written to the media file onto the shared storage, and it will be requiring this media. It therefore waits until it receives the next refined message (step 510), and then issues another query to the index service (step 504). It is expected that an entry for the required element will then be present in the index, and that the reader system will be able to proceed to retrieving the location information, retrieving the required element, and enabling the editor to proceed with viewing or editing the required element (steps 506, 508). In another playback state, the editor wishes to work with media that is well ahead of the record head, i.e., not near the record head as in the playback state just described. In this case, the required element may not be captured and written to shared storage for some time. Since refined messages include information as to the temporal location of the elements most recently written to the media file, the reader system is able to use this information together with the temporal location of the media that the editor requested to estimate when the required element will be written to shared storage. The reader system then displays an indication to the user that the required element is not yet available, displaying, for example, a caption "Media Capture in Progress" (step 512). In order to avoid repeatedly querying the index service in vain, the reader system waits until the time when it estimates that the required element will be written to the shared storage (step 514), and issues another query (step 504) to the index service. If the estimate is accurate, the index will now contain the location information requested, which will be returned to the reader system, which then retrieves the required element from shared storage (step 506) and enables an editor using a media editing application on the reader system to edit or play back a portion of the media file that includes the required element (step 508). If the reader's estimate is inaccurate, the reader may re-estimate a new time to reissue a query to the index based on the information returned in the unsuccessful query. While waiting for new frames to arrive, the reader system continues to be able to work in parallel to allow the editor to work with media elements already known about and stored on shared storage.

As recording and editing proceeds, the sequence of steps shown in FIGS. 4 and 5 are repeated, with the reader's entry point (steps 402, 502) being repeatedly invoked.

The index service can service multiple files during capture. Each media file being written to shared storage is handled by its own writer and reader, which may be implemented as different processes running on the same writer system (102) and reader system (104) described above. The steps described above with reference to the writer system and the reader system equally apply to software-implemented processes running on the writer system and the reader system. The index service maintains a separate index for each of the files. A common use case involves an editor editing a media project comprising one or more video tracks and one or more audio tracks. In such a case, the reader processes for multiple files, one for each of the video tracks and audio tracks, service a single media processing application running on the reader system.

The indexing service described herein provides several advantages as compared to prior systems in which a reader has no access to an index, or has to work with an index located within an incomplete file. A first advantage stems from the positive information received by a reader as to the state of the media file on shared storage when it receives a message. This keeps the reader informed as to what new elements have arrived so it does not waste time continually requesting elements that are not yet present. Should errors in the writing process occur, messages keep the reader informed as to what is happening. By contrast, when attempting to read a media file directly, a reader may receive an error and have no information as to the cause of the error, which might indicate a network outage, a corrupt or partially written media element, or incomplete file synchronization, such as might occur in the case of an interrupted restore from archive. When such an error is received, the reader system has to wait an unknown period of time before the error condition is removed and reading can resume.

Another advantage of the described index service is the format-independent nature of the index. Readers do not have to know the specifics of each media file format, and can access elements within the media file during media capture by using only information stored in the index. By contrast, if a reader is reading a file containing an index directly, it needs to know where to find the index, or the one or more portions of the index if it is split into sections.

The various components of the various systems described herein may be implemented as a computer program using general-purpose computer systems. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

System such as those described herein may be implemented in software, hardware, firmware, or a combination of the three. The various elements of the systems, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory storage system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of maintaining an index for a media file while the media file is being received, the method comprising:
   at a first system, receiving an indication that a media file is to be received;
   creating an index for the media file on a second system; and
   for each portion of a plurality of portions of the media file:
      the first system:
         receiving the portion;
         sending the portion to a shared media storage system to be stored on a shared storage system; and
         sending to a message broker system a raw message that includes information defining locations within the media file of a plurality of media elements comprising the received portion;
      the message broker system:
         receiving the raw message; and
         in response to receiving the raw message, broadcasting the raw message on a message bus; and
      at the second system:
         receiving the raw message from the message broker system; and
         in response to receiving the raw message, incrementally writing to the index the information defining locations within the media file of the plurality of media elements comprising the received portion.

2. The method of claim 1, wherein a quantity of data contained within each portion of the plurality of portions of the media file corresponds to a storage capacity of a file system cache of the first system.

3. The method of claim 1, wherein the media file is a video file, and wherein each media element of the plurality of media elements is a video frame of the video file.

4. The method of claim 1, wherein the media file is an audio file, and wherein each media element of the plurality of media elements is an audio sample of the audio file.

5. The method of claim 1, further comprising:
   the second system:
      converting the received raw message into a refined message, wherein the refined message includes a notification that the media file has changed and does not include the information defining locations within the media file of the plurality of media elements comprising the received portion; and
      sending the refined message to the message broker; and
   the message broker receiving and broadcasting the refined message over the message bus.

6. The method of claim 1, further comprising a third system connected to the message bus and to the shared storage, wherein the third system:
   receives the raw message broadcast by the message broker;
   uses the information defining the locations within the media file of the plurality of media elements comprising the received portion of the media file to retrieve from the shared storage one or more of the plurality of elements comprising the received portion of the media file; and
   enables a user of a media editing application running on the third system to view and edit a portion of the media file that includes the retrieved one or more of the plurality of elements.

7. The method of claim 1, further comprising a third system connected to the message bus and to the shared storage, wherein the third system:
   is configured to receive raw messages from the message broker; and
   requires an element of the media file that it has not previously retrieved from shared storage; and
   further comprising the third system:
      determining whether the third system has information from previously received raw messages that specifies whether the required element is available from the shared storage;
      if the third system has information from previously received raw messages that the required element is available from the shared storage, using information defining a location of the required element within the media file to retrieve the required element from the shared storage; and
      if the third system does not have information from previously received raw messages that the required element is available from the shared storage, issuing a query to the second system to determine whether the index includes an entry for the required element and, if the index includes an entry for the required element, retrieving from the index location information for the required element and using the location information to retrieve the required element from shared storage.

8. The method of claim 7, further comprising:
   if the third system receives a response from the second system that the index does not include an entry for the required element, displaying on a display of the third system an indication that the requested element is not yet available.

9. The method of claim 1, further comprising a third system connected to the message bus and to the shared storage, wherein the third system:
is configured to receive refined messages from the message broker; and
requires an element of the media file that it has not previously retrieved from shared storage; and
further comprising:
issuing a query to the second system to determine whether the index includes an entry for the required element, and, if the index includes an entry for the required element, retrieving location information for the required element and retrieving the required element from shared storage; and
if the third system receives a response from the second system that the index does not include an entry for the required element:
after waiting until the required element is expected to be present on the shared storage, issuing a second query to the second system to determine whether the index includes an entry for the required element; and
if the index includes an entry for the required element, retrieving from the index location information for the required element and using the location information to retrieve the required element from shared storage.

10. The method of claim 9, wherein information as to when the required element is expected to be present is included within a raw message received by the third system.

11. The method of claim 9, wherein information as to when the required element is expected to be present is included within a refined message received by the third system.

12. The method of claim 1, further comprising a third system connected to the message bus and to the shared storage, wherein the third system:
is configured to receive refined messages from the broker; and
requires an element of the media file that it has not previously retrieved from shared storage, the required element corresponding to a temporal location within the media file that is temporally close to a most recently captured element of the media file; and
further comprising:
the third system receiving a refined message; and
in response to receiving the refined message, issuing a query to the second system to determine whether the index includes an entry for the required element, and if the index includes an entry for the required element, retrieving from the index location information for the required element and using the location information to retrieve the required element from shared storage.

13. An indexing system comprising:
a memory for storing computer-readable instructions; and
a processor connected to the memory, wherein the processor, when executing the computer-readable instructions, causes the indexing system to perform a method for maintaining an index for a media file while the media file is being received, the method comprising:
in response to receiving an indication that a media file is to be received by a writing system for writing the media file to shared storage, creating an index for the media file on the indexing system; and
for each portion of a plurality of portions of the media file received by the writing system, the indexing system:
receiving over a message bus a raw message sent by a message broker in response to receiving the raw message from the writing system, and wherein the raw message includes information defining locations within the media file of a plurality of media elements comprising the received portion of the media file; and
in response to receiving the raw message, incrementally writing to the index the information defining locations within the media file of the plurality of media elements comprising the received portion of the media file.

14. The system of claim 13, wherein the method for maintaining an index for a media file further comprises:
converting the received raw message into a refined message, wherein the refined message includes a notification that the media file has changed and does not include the information defining locations within the media file of the plurality of media elements comprising the received portion; and
sending the refined message to the message broker for broadcasting the refined message over the message bus.

15. The system of claim 13, wherein the method for maintaining an index for a media file further comprises:
in response to receiving a query from a reading system for location information within the media file for a specified one or more elements of the media file:
if the index includes an entry for the specified one or more elements of the media file, providing a response to the reading system that includes location information for the specified one or more elements of the media file.

16. The system of claim 15, wherein the method for maintaining an index for a media file further comprises:
if the index does not include an entry for the specified one or more elements of the media file, providing a response to the reading system that includes information as to a temporal location of a most recently received element of the media file.

17. A computer program product comprising:
a non-transitory computer-readable medium with computer program instructions encoded thereon, wherein the computer program instructions, when processed by an indexing system instruct the indexing system to perform a method for maintaining an index for a media file while the media file is being received, the method comprising:
in response to receiving an indication that a media file is to be received by a writing system for writing the media file to shared storage, creating an index for the media file on the indexing system; and
for each portion of a plurality of portions of the media file received by the writing system:
receiving over a message bus a raw message sent by a message broker in response to receiving the raw message from the writing system, and wherein the raw message includes information defining locations within the media file of a plurality of media elements comprising the received portion of the media file; and
in response to receiving the raw message, incrementally writing to the index the information defining locations within the media file of the plurality of media elements comprising the received portion of the media file.

18. The computer program product of claim 17, wherein the method for maintaining an index for a media file further comprises:
    converting the received raw message into a refined message, wherein the refined message includes a notification that the media file has changed and does not include the information defining locations within the media file of the plurality of media elements comprising the received portion; and
    sending the refined message to the message broker for broadcasting the refined message over the message bus.

19. The computer program product of claim 17, wherein the method for maintaining an index for a media file further comprises:
    in response to receiving a query from a reading system for location information within the media file for a specified one or more elements of the media file:
        if the index includes an entry for the specified one or more elements of the media file, providing a response to the reading system that includes location information for the specified one or more elements of the media file.

20. The computer program product of claim 19, wherein the method for maintaining an index for a media file further comprises:
    if the index does not include an entry for the specified one or more elements of the media file, providing a response to the reading system that includes information as to a temporal location of a most recently received element of the media file.

* * * * *